(12) United States Patent
Varaprasad (10) Patent No.: US 7,744,951 B2
(45) Date of Patent: Jun. 29, 2010

(54) COATED GLASS SUBSTRATE WITH INFRARED AND ULTRAVIOLET BLOCKING CHARACTERISTICS

(75) Inventor: Desaraju V. Varaprasad, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 548 days.

(21) Appl. No.: 11/402,856

(22) Filed: Apr. 13, 2006

(65) Prior Publication Data

US 2007/0243391 A1 Oct. 18, 2007

(51) Int. Cl.
B05D 5/06 (2006.01)

(52) U.S. Cl. .......................... 427/162; 427/165; 428/688

(58) Field of Classification Search .................. 427/162, 427/165; 428/688
See application file for complete search history.

(56) References Cited

U.S. PATENT DOCUMENTS

| | | | |
|---|---|---|---|
| 5,316,854 A * | 5/1994 | Lin et al. ....................... 428/426 |
| 5,337,191 A * | 8/1994 | Austin ......................... 359/885 |
| 5,376,455 A | 12/1994 | Hartig et al. |
| 5,414,093 A | 5/1995 | Wolter |
| 5,480,722 A * | 1/1996 | Tomonaga et al. ........... 428/428 |
| 5,876,854 A * | 3/1999 | Kawazu et al. .............. 428/428 |
| 5,942,331 A * | 8/1999 | Miyauchi et al. ............ 428/428 |
| 6,261,694 B1 * | 7/2001 | Iacovangelo ................. 428/412 |
| 6,617,018 B2 * | 9/2003 | Tamai et al. ................. 428/328 |
| 6,632,491 B1 | 10/2003 | Thomsen et al. |
| 6,770,257 B1 | 8/2004 | Imura et al. |
| 6,805,960 B1 * | 10/2004 | Demiryont ................... 428/432 |
| 6,846,556 B2 | 1/2005 | Boire et al. |
| 6,863,928 B2 | 3/2005 | Stachowiak |
| 6,887,575 B2 | 5/2005 | Neuman et al. |
| 6,916,408 B2 | 7/2005 | Laird et al. |
| 6,926,967 B2 | 8/2005 | Neuman et al. |
| 6,936,347 B2 | 8/2005 | Laird et al. |
| 6,942,923 B2 | 9/2005 | Stachowiak |
| 6,946,498 B2 | 9/2005 | Kayanoki |
| 6,967,060 B2 | 11/2005 | Stachowiak |

(Continued)

FOREIGN PATENT DOCUMENTS

EP 0 992 456 4/2000

(Continued)

OTHER PUBLICATIONS

"Ultraviolet Ray Absorbing Coatings on Glass for Automobiles", Morimoto et al., Thin Solid Films 351 (1999) 61-65.

(Continued)

Primary Examiner—Shamim Ahmed
(74) Attorney, Agent, or Firm—Nixon & Vanderhye P.C.

(57) ABSTRACT

A composite oxide coating is provided on a substrate over an infrared (IR) blocking multi-layer coating (e.g., low-E coating), where the composite oxide coating efficiently blocks ultraviolet (UV) radiation. The composite oxide coating and the low-E coating may be heat resistant, and the coated glass substrate may be processed in a single high temperature heat treatment step. The coated article may be effective at blocking both IR and UV radiation in applications such as window applications. The UV blocking coating may include ceria as a UV blocker in certain example embodiment of this invention.

15 Claims, 6 Drawing Sheets

U.S. PATENT DOCUMENTS

| | | |
|---|---|---|
| 6,974,630 B1 | 12/2005 | Stachowiak |
| 6,991,678 B2 | 1/2006 | Dongare et al. |
| 7,153,578 B2 * | 12/2006 | Chonlamaitri et al. ...... 428/428 |
| 2004/0057142 A1 | 3/2004 | Arfsten |
| 2005/0191502 A1 | 9/2005 | Lemmer et al. |

FOREIGN PATENT DOCUMENTS

| WO | WO 03/099735 | 12/2003 |
|---|---|---|

OTHER PUBLICATIONS

"Preparation and Properties of $TiO_2$-$CeO_2$ Coatings by the Sol-Gel Process", Makishima et al., Journal of Non-Crystalline Solids 121 (1990) 310-314.

"Sol Gel Preparation of Mixed Cerium-Titanium Oxide Thin Films", Keomany et al., Solar Energy Materials and Solar Cells 33 (1994) 429-441.

* cited by examiner

COATED GLASS SUBSTRATE WITH INFRARED AND ULTRAVIOLET BLOCKING CHARACTERISTICS

This invention relates to a coated glass substrate having an infrared (IR) blocking coating and an ultraviolet (UV) blocking coating both of which may be heat resistant and may be subjected to high temperatures such as those used during thermal tempering of glass. In certain example embodiments of this invention, a UV blocking layer(s) is formed on a glass substrate over a multi-layer low-E (low emissivity) coating, so that the overall coating including the UV blocking layer(s) and the low-E coating is capable of blocking significant amounts of both IR and UV radiation.

BACKGROUND AND SUMMARY OF EXAMPLE EMBODIMENTS OF THE INVENTION

Commercial products such as low-E coatings used for solar energy management effectively block large amounts of infrared (IR) radiation but fail to block significant amounts of ultraviolet (UV) radiation. Meanwhile, coatings specifically designed to block UV radiation tend to be fairly transparent to IR radiation. Thus, there is a need in the art for a coating which is effective at blocking significant amounts of both IR and UV radiation.

A coating sol comprising zinc antimonate is known in the art, under the tradename Celnax. For example, see Nissan Chemical's website at www.snowtex.com/celnax.htm for the absorption spectrum of Celnax sol (zinc antimonate sol) which is mixed with a resin. The nanoparticles of the antimony double oxide absorb significant amounts of IR, while allowing a good portion of UV and significant amounts of visible radiation to transmit therethrough. For example, see U.S. Pat. No. 6,149,888, the disclosure of which is hereby incorporated herein by reference. Thus, unfortunately, this coating is not good at blocking IR radiation. It would be desirable if such coatings could be designed so as to improve blockage of UV radiation.

Figure 1:
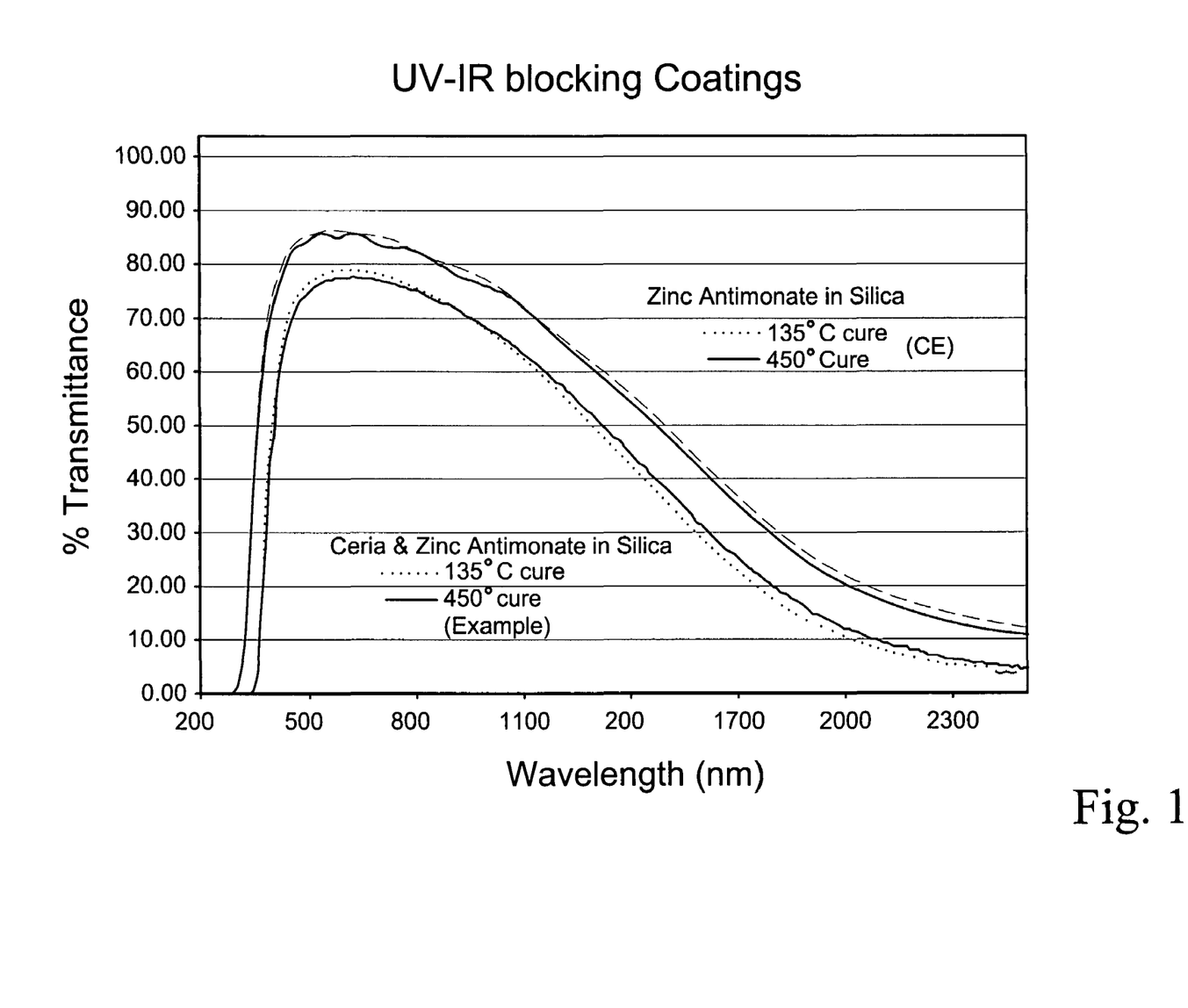
FIG. 1 is a graph comparing transmission characteristics of a coating according to Ser. No. 11/229,837 (Example) to those of a known coating (CE).

U.S. Ser. No. 11/229,837, filed Sep. 20, 2005 and hereby incorporated herein by reference, discloses a composite oxide coating that efficiently blocks both UV and IR radiation, e.g., a colloidal electro-conductive oxide solution having infrared (IR) and ultraviolet (UV) blocking characteristics may be used in forming the coating. In Ser. No. 11/229,837, a substantially transparent composite oxide coating is provided that includes a silica matrix, zinc antimonate, and a UV blocking material, thereby permitting the sol after application to block significant amounts of both IR and UV radiation. The UV and IR blocking coating may comprise each of cerium oxide and zinc antimonate in the form of nanoparticulate, and silicon oxide (e.g., $SiO_2$) formed from precursor materials such as silane(s). It has surprisingly been found that such coatings of Ser. No. 11/229,837 are effective at blocking both UV and IR radiation as shown in FIG. 1. In certain example embodiments of Ser. No. 11/229,837, the coating sol from which coatings are formed comprises from about 15 to 50% cerium oxide (more preferably from about 20 to 45%, and most preferably from about 30 to 40%), from about 30 to 70% zinc antimonate (more preferably from about 35 to 65%, and most preferably from about 40 to 55%), and from about 5 to 35% silicon oxide (more preferably from about 10 to 30%, and most preferably from about 12 to 25%). It has been found that these amounts of such materials in the coating sol provide a coating that is effective at blocking both UV and IR radiation.

In Ser. No. 11/229,837, a coating sol was coated on a substrate, and its transmission characteristics measured as shown in FIG. 1. In FIG. 1, the coating sol was applied to a glass substrate and included cerium oxide and zinc antimonate in nanoparticulate form, and silicon dioxide, in amounts of 47 mole % zinc antimonate, 36 mole % cerium oxide and 17 mole % $SiO_2$. When this sol was applied to a glass substrate at a thickness of about 2 microns, the coated article yielded average UV transmission in the range of 300-380 nm of about 10% as shown in FIG. 1. When the cerium oxide was not present (see comparative example CE in FIG. 1), the UV transmission was undesirably higher. Different cure temperatures for the coating on the glass substrate are shown in FIG. 1 for the Example of Ser. No. 11/229,837 and the CE. Thus, in Ser. No. 11/229,837 a single layer coating is provided that blocks significant amounts of both IR and UV radiation.

Unfortunately, in certain situations the single layer coating of Ser. No. 11/229,837 may not be desirable because of the need to mix zinc antimonate, cerium oxide and $SiO_2$ in a single layer. In particular, this technique may suffer from incompatibility of mixing the different materials (e.g., instability of dispersions, formation of single phase materials, etc.) and thus may be limited to use of only certain combinations of materials to produce single layer coatings with both IR and UV blocking properties.

In certain example embodiments of this invention, there exists a need in the art for more efficient coating capable of blocking significant amounts of both IR and UV radiation. In certain example embodiments, a heat resistant coating is provided that may be processed (e.g., thermally tempered) cost effectively with minimal steps.

In certain example embodiments of this invention, there is provided a method of making a coated article, the method comprising: forming a low-E coating on a glass substrate, the low-E coating comprising at least one infrared (IR) reflecting layer located between at least first and second dielectric layers; applying a wet coating comprising titania and ceria on the glass substrate over the low-E coating, curing the wet coating solution to form a UV blocking coating on the glass substrate, the UV blocking coating comprising a mixture of oxides of cerium and titanium.

In certain example embodiments of this invention, there is provided a method of making a coated article, the method comprising: forming a low-E coating on a glass substrate, the low-E coating comprising at least one infrared (IR) reflecting layer located between at least first and second dielectric layers; applying a wet coating comprising at least one UV blocking oxide and/or at least one precursor of a UV blocking oxide on the glass substrate over the low-E coating, forming a UV blocking and IR blocking coating on the glass substrate and subjecting the coated glass substrate to a heat treatment process including temperatures of at least about 580 degrees C. In certain example embodiments, the wet coating comprises at least one metal oxide from the group consisting of ceria, titania, zinc oxide, bismuth oxide, tin oxide and antimony oxide, and/or a precursor of at least one of these metal oxides. In certain example embodiments, the UV blocking coating comprises: titanium oxide: from about 0-50%, cerium oxide: from about 40-98%, and silicon oxide: from about 5-50%.

In certain example embodiments, the UV blocking coating comprises: titanium oxide: from about 5-50%, and cerium oxide: from about 40-98%. In certain example embodiments, the UV blocking coating comprises: titanium oxide: from about 5-20%, and cerium oxide: from about 60-95%. In certain example embodiments, the coated article has a transmission at 600 nm of at least about 60%, or at least about 70%. In certain example embodiments, the coated article has a transmission at 1700 nm of no greater than about 30%.

In certain example embodiments of this invention, there is provided a method of making a coated article, the method comprising: forming a low-E coating on a glass substrate, the low-E coating comprising at least one infrared (IR) reflecting layer located between at least first and second dielectric layers; applying a wet coating comprising a silane and ceria on the glass substrate over the low-E coating, curing the wet coating to form a UV blocking coating on the glass substrate, the UV blocking coating comprising a mixture of oxides of silicon and cerium.

In other example embodiments of this invention, there is provided a coated article comprising: a glass substrate; a low-E coating provided on the glass substrate; a UV blocking coating provided on the glass substrate over at least the low-E coating; and wherein the UV blocking coating comprises cerium oxide and at least one of silicon oxide and titanium oxide.

DETAILED DESCRIPTION OF EXAMPLE EMBODIMENTS OF THE INVENTION

In certain example embodiments of this invention, coated articles are provided that block significant amounts of both IR and UV radiation. Such coated articles may be used in the context of windows such as architectural windows, IG window units, vehicle windows, and/or the like.

Figure 8:
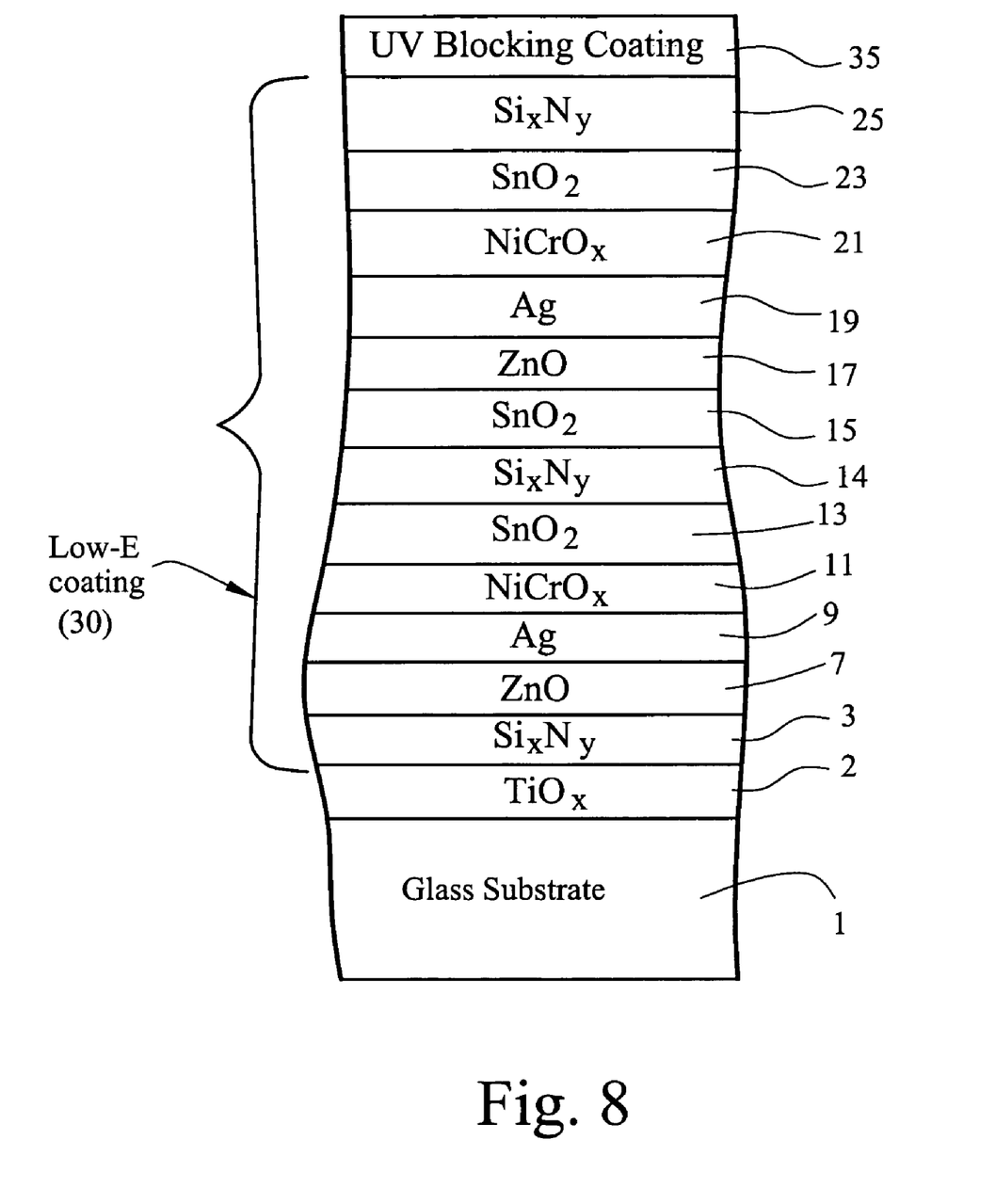
FIG. 8 is a cross sectional view of a coated article according to an example embodiment of this invention, illustrating the provision of a UV blocking on a glass substrate over a low-E coating.
Figure 9:
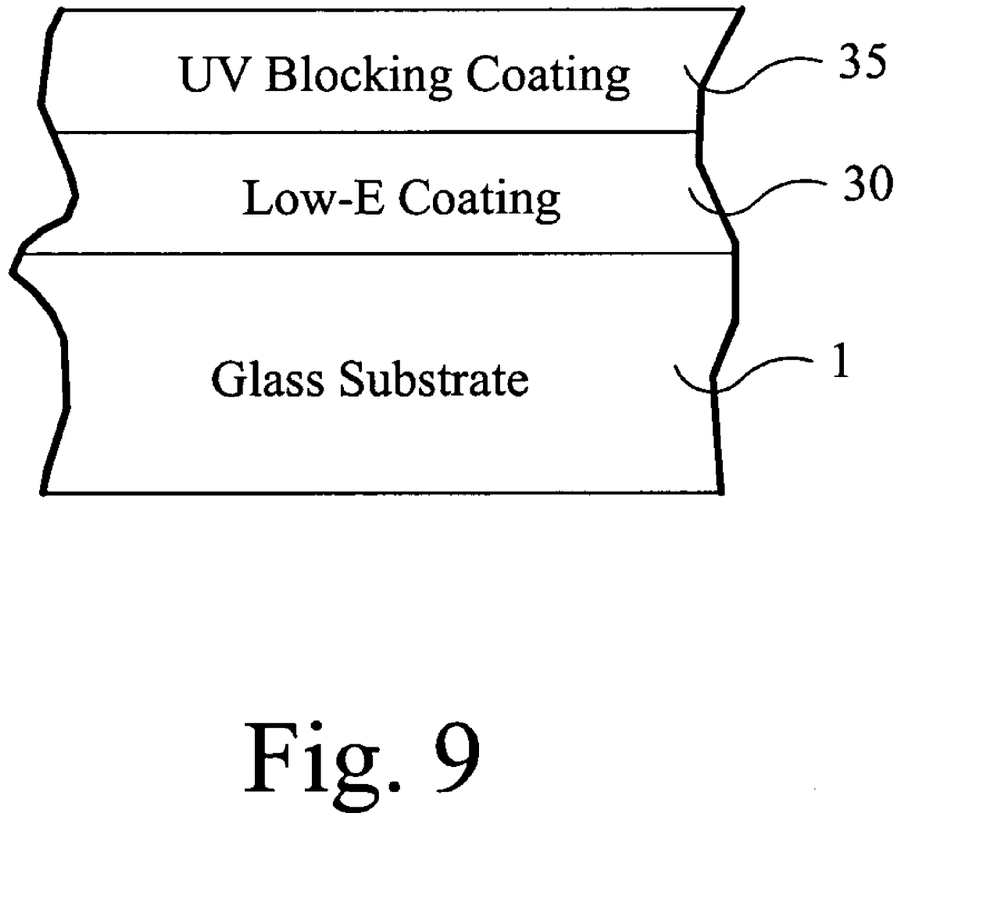
FIG. 9 is a cross sectional view of a coated article according to an example embodiment of this invention, illustrating the provision of a UV blocking on a glass substrate over a low-E coating.

In certain example embodiments of this invention, a UV blocking coating 35 is provided on a glass substrate over a heat treatable low-E (low emissivity) coating 30 as shown in FIG. 8 or FIG. 9. A low-E coating typically includes at least one infrared (IR) blocking layer of or including a material such as silver or gold for blocking significant amounts of IR radiation, where the IR blocking layer is located between at least first and second dielectric layers. Example materials of the dielectric layers include silicon nitride, tin oxide, zinc oxide and so forth. Any suitable low-E coating 30 may be used, and the example low-E coatings discussed herein are provided for purposes of example only. The combination of coatings 30 and 35 on the glass substrate permits the coated article to block significant amounts of both UV and IR radiation which has heretofore been difficult to achieve. Low-E coatings, while able to block significant amounts of IR radiation, are typically deficient when it comes to blocking UV radiation. In certain example embodiments of this invention, the UV blocking coating 35 may be formed as follows. A liquid coating solution (for a UV blocking coating that blocks significant amounts of UV radiation) is prepared by combining a titania sol or sol-gel with a cerium oxide inclusive solution. In certain example embodiments, titanium alkoxides as metal organic compounds may be used as the starting material for the production of the titania sol. Titanium alkoxides include, for example, titanium tetramethoxide, titanium tetraethoxide, titanium isopropoxide, titanium n-propoxide, titanium tetra n-butoxide, titanium tetraisobutoxide, titanium methoxypropoxide, and titanium dichloride diethoxide. The titanium alkoxide sol may be pre-hydrolyzed in certain example instances. In certain example embodiments, the titania sol may include from about 2-20% titania, more preferably from about 3-10% titania, with an example being about 5% by weight of titania. Optionally, titanium oxalate and/or nitrate may be used as a metal organic compound as a starting material for the titania sol.

The cerium oxide inclusive solution may be a cerium nitrate solution in certain example embodiments of this invention, although other types of cerium oxide inclusive solution may instead be used. In certain example embodiments, the ceria inclusive solution includes from about 5-50% ceria, more preferably from about 10-30%, with an example being about 18% by weight ceria. The coating solution may optionally contain at least one silane such as TEOS.

The mixture of the titania sol and the ceria inclusive solution may be stabilized by an additive in certain example embodiments. An alcohol may be used as a solvent in the wet coating solution in certain example instances. Examples of compounds that may be used as stabilizer additives include glycols, alcohols, polyols, beta-diketones, amines, amino alcohols and acetic acid esters. Examples of additives that may be used as a stabilizer in the wet coating solution include mono and dialkyl ethers of ethylene glycol and/or propylene glycol, acetyl acetone, acetoacetic acid, cyanoethylacetate, ethylacetoacetate, polyethylene glycols, caprolactone polyols, acrylic polyols, triethanol amine, methyl diethanol amine, and EDTA.

The coating solution including the titania sol and the ceria inclusive solution, optionally including at least one silane, may then be applied (e.g., via spin coating) on a glass substrate, optionally over a low-E coating 30. The coating is then dried on a hot plate for a period of time at a temperature of from about 80-200 degrees C. (e.g., about 130 degrees C.) for about 3-10 minutes, and may then be heated in an oven at from about 150-300 degrees C. (e.g., at about 220 degrees C.) for from about 3-10 minutes for curing the UV blocking coating. The UV blocking coating 35 was thus made up of a mixture of oxides of cerium and titanium (e.g., $CeO_2/TiO_2$) in this example embodiment. The coated article may then be thermally tempered in a tempering furnace at a temperature of at least about 580 degrees C., more preferably at least about 600 degrees C. for a period of time sufficient to thermally temper the glass substrate 1. Thus, the result is a thermally tempered coated article including the low-E coating 30 thereon for blocking significant amounts of IR radiation, and the UV coating 35 provided on the glass substrate 1 over the low-E coating 30 for blocking significant amounts of UV radiation (e.g., see FIGS. 8-9).

In other example embodiments, the UV blocking coating 35 may be made of or include a mixture of oxides of cerium and silicon (e.g., $CeO_2/SiO_2$). In such example embodiments, a coating sol (for a UV blocking coating 35 that blocks significant amounts of UV radiation) may be prepared by mixing cerium oxide in the form of an aqueous dispersion of nanoparticulate with a silane such as pre-hydrolyzed 3-glycidoxypropyl trimethoxysilane to obtain a weight ratio of about 60-98% (more preferably from about 70-95%, e.g., 90%) ceria to about 2-40% (more preferably from about 5-30%, e.g., 10%) silica. Other silanes or mixtures of silanes and titanates may instead be used. The mixture may then be diluted with n-propanol or the like and applied on a glass substrate 1 (e.g., directly or over a low-E coating) via spin coating or the like. The coated article may then be subjected to the heat treating discussed above. The UV blocking coating 35 was thus made up of or includes a mixture of oxides of cerium and silicon (e.g., $CeO_2/SiO_2$) in this alternative embodiment of this invention.

Example low-E coatings 30 which may be used in different embodiments of this invention are described, for purposes of example and without limitation, in the following U.S. Patent documents the disclosures of all of which are hereby incorporated herein by reference: 2005/0191502, Ser. No. 10/914, 636, U.S. Pat. Nos. 6,936,347, 6,974,630, 6,967,060, 6,942, 923, 6,887,575, 3,382,528, 6,576,349, 6,926,967, 6,916,408, 6,632,491, and 6,863,928.

FIG. 8 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 3.5 mm thick), and low-E coating (or layer system) 30 provided on the substrate 1 either directly or indirectly. The low-E coating 30 includes: bottom dielectric layer 2 which may be of or include titanium oxide (e.g., $TiO_2$) or the like, dielectric silicon nitride layer 3 which may be $Si_3N_4$, of the Si-rich type for haze reduction, or of any other suitable stoichiometry in different embodiments of this invention, first lower contact layer 7 (which contacts IR reflecting layer 9), first conductive and preferably metallic infrared (IR) reflecting layer 9, first upper contact layer 11 (which contacts layer 9), dielectric layer 13 (which may be deposited in one or multiple steps in different embodiments of this invention), another silicon nitride layer 14, tin oxide inclusive interlayer 15, second lower contact layer 17 (which contacts IR reflecting layer 19), second conductive and preferably metallic IR reflecting layer 19, second upper contact layer 21 (which contacts layer 19), dielectric layer 23, and finally protective dielectric layer 25 at the interface with the overlying UV blocking coating 35. The "contact" layers 7, 11, 17 and 21 each contact at least one IR reflecting layer (e.g., layer based on Ag). The aforesaid layers 2-25 make up low-E (i.e., low emissivity) coating 30 which is provided on glass or plastic substrate 1. The UV blocking coating 35 is provided on the glass substrate 1 over at least the low-E coating 30.

In monolithic instances, the coated article includes only one glass substrate 1 as illustrated in FIG. 8. However, monolithic coated articles herein may be used in devices such as laminated vehicle windshields, IG window units, and the like. A laminated vehicle window such as a windshield typically includes first and second glass substrates laminated to one another via a polymer based interlayer (e.g., see U.S. Pat. No. 6,686,050, the disclosure of which is incorporated herein by reference). One of these substrates of the laminate may support coatings 30, 35 on an interior surface thereof in certain example embodiments. As for IG window units, an IG window unit may include two spaced apart substrates. An example IG window unit is illustrated and described, for example, in U.S. Pat. No. 6,632,491, the disclosure of which is hereby incorporated herein by reference.

Dielectric layer 2 is in direct contact with the glass substrate 1, and is optional. Dielectric layer 2 may be of or include $TiO_x$ in certain example embodiments of this invention, where x is from 1.5 to 2.0, more preferably about 2.0.

Dielectric layers 3 and 14 may be of or include silicon nitride in certain embodiments of this invention. Silicon nitride layers 3 and 14 may, among other things, improve heat-treatability of the coated articles, e.g., such as thermal tempering or the like. The silicon nitride of layers 3 and/or 14 may be of the stoichiometric type (i.e., $Si_3N_4$), or alternatively of the Si-rich type in different embodiments of this invention. For example, Si-rich silicon nitride 3 (and/or 14) combined with zinc oxide and/or tin oxide under a silver based IR reflecting layer may permit the silver to be deposited (e.g., via sputtering or the like) in a manner which causes its sheet resistance to be lessened compared to if certain other material(s) were under the silver. Moreover, the presence of free Si in a Si-rich silicon nitride inclusive layer 3 may allow certain atoms such as sodium (Na) which migrate outwardly from the glass 1 during HT to be more efficiently stopped by the Si-rich silicon nitride inclusive layer before they can reach the silver and damage the same. Thus, it is believed that the oxidation caused by heat treatment allows visible transmission to increase, and that the Si-rich $Si_xN_y$ in layer 3 can reduce the amount of damage done to the silver layer(s) during HT in certain example embodiments of this invention thereby allowing sheet resistance ($R_s$) to decrease or remain about the same in a satisfactory manner. Further details of this layer may be found in U.S. Ser. No. 10/914,636 which is incorporated herein by reference. Any and/or all of the silicon nitride layers discussed herein may be doped with other materials such as stainless steel or aluminum in certain example embodiments of this invention. For example, any and/or all silicon nitride layers discussed herein may optionally include from about 0-15% aluminum, more preferably from about 1 to 10% aluminum, in certain example embodiments of this invention. The silicon nitride may be deposited by sputtering a target of Si or SiAl in certain embodiments of this invention.

Infrared (IR) reflecting layers 9 and 19 are preferably substantially or entirely metallic and/or conductive, and may comprise or consist essentially of silver (Ag), gold, or any other suitable IR reflecting material. IR reflecting layers 9 and 19 help allow the coating to have low-E and/or good solar control characteristics. The IR reflecting layers may, however, be slightly oxidized in certain embodiments of this invention. Due to the IR reflecting layer(s), the coated article may have a transmission at about 2300 nm of no more than about 10%, more preferably no more than about 5%.

The upper contact layers 11 and 21 may be of or include nickel (Ni) oxide, chromium/chrome (Cr) oxide, or a nickel alloy oxide such as nickel chrome oxide ($NiCrO_x$), or other suitable material(s), in certain example embodiments of this invention. The use of, for example, $NiCrO_x$ in these layers (11 and/or 21) allows durability to be improved. The $NiCrO_x$ of layers 11 and/or 21 may be fully oxidized in certain embodiments of this invention (i.e., fully stoichiometric), or alternatively may only be partially oxidized. In certain instances, the $NiCrO_x$ layers 11 and/or 21 may be at least about 50% oxidized. Contact layers 11 and/or 21 (e.g., of or including an oxide of Ni and/or Cr) may or may not be oxidation graded in different embodiments of this invention. Oxidation grading means that the degree of oxidation in the layer changes throughout the thickness of the layer so that for example a contact layer may be graded so as to be less oxidized at the contact interface with the immediately adjacent IR reflecting layer than at a portion of the contact layer(s) further or more/most distant from the immediately adjacent IR reflecting layer. Descriptions of various types of oxidation graded contact layers are set forth in U.S. Pat. No. 6,576,349, the disclosure of which is hereby incorporated herein by reference. Contact layers 11 and/or 21 (e.g., of or including an oxide of Ni and/or Cr) may or may not be continuous in different embodiments of this invention across the entire IR reflecting layer.

Dielectric layer 13 may be of or include tin oxide in certain example embodiments of this invention. However, as with other layers herein, other materials may be used in different instances.

Lower contact layers 7 and/or 17 in certain embodiments of this invention are of or include zinc oxide (e.g., ZnO). The zinc oxide of layers 7 and 17 may contain other materials as well such as Al (e.g., to form $ZnAlO_x$). For example, in certain example embodiments of this invention, one or more of zinc oxide layers 7, 17 may be doped with from about 1 to 10% Al, more preferably from about 1 to 5% Al, and most preferably about 1 to 4% Al.

Interlayer 15 of or including tin oxide is provided under IR reflecting layer 19 so as to be located between silicon nitride layer 14 and zinc oxide layer 17. Surprisingly, as explained above, it has been found that the use of such a tin oxide inclusive interlayer 15 results in numerous improvements compared to a situation where the layer 15 is not provided. For example, it has been found that the use of such a tin oxide inclusive interlayer 15 results in a coated article which is capable of realizing: (a) less visible transmission shift due to heat treatment, (b) higher visible transmission following heat treatment; (c) less shifting of certain color value(s) due to heat treatment, (d) substantially neutral coloration following heat treatment; (e) more stable, or even decreasing, sheet resistance due to heat treatment, (f) lower sheet resistance and thus lower emissivity following heat treatment, (g) improved haze characteristics following heat treatment, and/or (h) improved mechanical durability such as scratch resistance before and/or after heat treatment. Thus, in certain example embodiments of this invention, coated articles may be taken to higher temperatures during heat treatment and/or for longer times without suffering undesirable significant transmission drops and/or increases in sheet resistance. In certain alternative embodiments, it is possible to dope the tin oxide of layer 15 with other materials such as Al, Zn or the like. Alternatively, other metal oxide(s) may be used for layer 15 in certain instances.

Dielectric layer 23 may be of or include tin oxide in certain example embodiments of this invention. However, layer 23 is optional and need not be provided in certain example embodiments of this invention. Dielectric layer 25, which may be an overcoat in certain example instances, may be of or include silicon nitride (e.g., $Si_3N_4$) or any other suitable material in certain example embodiments of this invention. Optionally, other layers may be provided above layer 25. Layer 25 is provided for durability purposes, and to protect the underlying layers during heat treatment and/or environmental use. In certain example embodiments, layer 25 may have an index of refraction (n) of from about 1.9 to 2.2, more preferably from about 1.95 to 2.05.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 8 may be considered "on" and "supported by" the substrate 1 even if other layer(s) are provided between layer 2 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention. The layers of the low-E coating 30 may be formed on the glass substrate by sputtering or any other suitable technique.

While various thicknesses and materials may be used in layers for the low-E coating 30 in different embodiments of this invention, example thicknesses and materials for the respective layers of the low-E coating 30 on the glass substrate 1 in the FIG. 8 embodiment are as follows, from the glass substrate outwardly:

Example Low-E Materials/Thicknesses; FIG. 8 Embodiment

| Layer | Preferred Range (Å) | More Preferred (Å) | Example (Å) |
|---|---|---|---|
| Glass (1-10 mm thick) | | | |
| $TiO_2$ (layer 2) | 10-120 Å | 20-80 Å | 33 Å |
| $Si_xN_y$ (layer 3) | 40-450 Å | 70-300 Å | 110 Å |
| $ZnO_x$ (layer 7) | 10-300 Å | 40-150 Å | 100 Å |
| Ag (layer 9) | 50-250 Å | 80-120 Å | 107 Å |
| $NiCrO_x$ (layer 11) | 10-100 Å | 12-40 Å | 18 Å |
| $SnO_2$ (layer 13) | 0-1,000 Å | 200-700 Å | 382 Å |
| $Si_xN_y$ (layer 14) | 50-450 Å | 80-200 Å | 110 Å |
| $SnO_2$ (layer 15) | 30-250 Å | 50-200 Å | 100 Å |
| $ZnO_x$ (layer 17) | 10-300 Å | 40-150 Å | 100 Å |
| Ag (layer 19) | 50-250 Å | 80-220 Å | 159 Å |
| $NiCrO_x$ (layer 21) | 10-100 Å | 20-45 Å | 36 Å |
| $SnO_2$ (layer 23) | 0-750 Å | 40-200 Å | 100 Å |
| $Si_3N_4$ (layer 25) | 0-750 Å | 80-320 Å | 193 Å |

The UV blocking coating 35 is then formed on the glass substrate 1 over the low-E coating 30, by spin-coating or in any other suitable manner. In certain example embodiments of this invention, the UV blocking coating 35 may be from about 0.05 to 1.5 µm thick, more preferably from about 0.08 to 0.3 µm thick, and most preferably from about 0.1 to 0.2 µm thick. The UV blocking coating 35 may be of or include a mixture of oxides of titanium and cerium in certain example embodiments of this invention. In other example embodiments, the UV blocking coating 35 may be of or include a mixture of oxides of silicon and cerium.

In certain example embodiments of this invention, coated articles herein, including each of the low-E coating 30 and the UV blocking coating 35, may have the following optical and solar characteristics when measured monolithically (before any optional thermal tempering). The sheet resistances ($R_s$) herein take into account all IR reflecting layers.

|  | Optical/Solar Characteristics (Monolithic; pre-HT) | | |
|---|---|---|---|
| Characteristic | General | More Preferred | Most Preferred |
| $R_s$ (ohms/sq.): | <=5.0 | <=4.0 | <=3.0 |
| $E_n$: | <=0.07 | <=0.04 | <=0.03 |
| $T_{vis}$ (Ill. C 2°): | >=70% | >=74% | >=75% |
| $T_{UV}$ | <=12% | <=7% | <=5% |

In certain example embodiments, coated articles herein may have the following characteristics, measured monolithically for example, after heat treatment (HT) at a temperature of at least about 580 degrees C., more preferably at least about 600 degrees C.:

|  | Optical/Solar Characteristics (Monolithic; post-HT) | | |
|---|---|---|---|
| Characteristic | General | More Preferred | Most Preferred |
| $R_s$ (ohms/sq.): | <=3.0 | <=2.5 | <=2.1 (or <=2.0) |
| $E_n$: | <=0.07 | <=0.04 | <=0.03 |
| $T_{vis}$ (Ill. C 2°): | >=75% | >=77% | >=78% |
| Transmitted Haze: | <=0.6 | <=0.5 | <=0.4 |
| $T_{UV}$ | <=12% | <=7% | <=5% |

Moreover, in certain example laminated embodiments of this invention, coated articles herein which have been heat treated to an extent sufficient for tempering, and which have been coupled to another glass substrate to form an IG unit, may have the following IG unit optical/solar characteristics.

Example Optical Characteristics (IG Unit: post-HT)

| Characteristic | General | More Preferred |
|---|---|---|
| $T_{vis}$ (or TY)(Ill. C 2°): | >=60% | >=69% |
| $a*_t$ (Ill. C 2°): | -6 to +1.0 | -5 to 0.0 |
| $b*_t$ (Ill. C 2°): | -2.0 to +8.0 | 0.0 to 4.0 |
| $L*$ (Ill. C 2°): | 80-95 | 84-95 |
| $R_fY$ (Ill. C, 2 deg.): | 1 to 13% | 1 to 12% |
| $a*_f$ (Ill. C, 2°): | -5.0 to +2.0 | -4.0 to +0.5 |
| $b*_f$ (Ill. C, 2°): | -14.0 to +10.0 | -4.0 to +3.5 |
| $L*$ (Ill. C 2°): | 30-45 | 33-41 |
| $R_gY$ (Ill. C, 2 deg.): | 1 to 12% | 1 to 10% |
| $a*_g$ (Ill. C, 2°): | -5.0 to +2.0 | -2.5 to +0.5 |
| $b*_g$ (Ill. C, 2°): | -10.0 to +10.0 | -5.0 to 0 |
| $L*$ (Ill. C 2°): | 30-40 | 33-38 |
| SHGC (surface 2): | <=0.42 | <=0.38 |
| SHGC (surface 3): | <=0.47 | <=0.45 |
| $T_{UV}$ | <=12% | <=7% (or <=5%) |

The following examples of different embodiments of this invention are provided for purposes of example and understanding only, and are not intended to be limiting unless expressly claimed.

EXAMPLE 1

Figure 2:
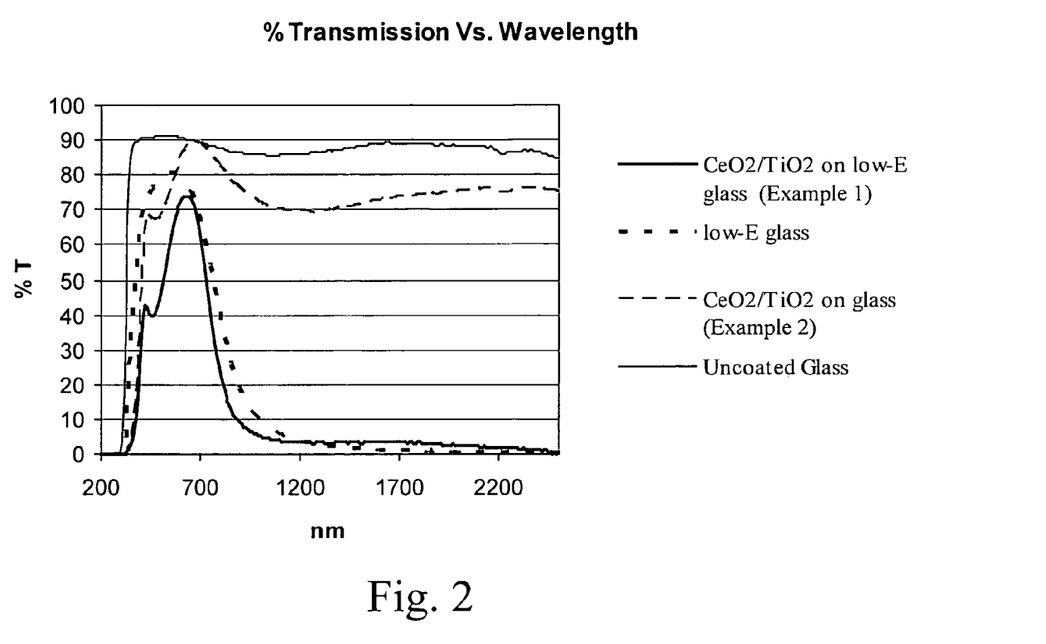
FIG. 2 is a transmission (% T) vs. wavelength graph illustrating the spectral response of coated articles of Example 1 herein compared to other articles in the wavelength range of from about 200 to 2500 nm.

In Example 1, a coating solution (for a UV blocking coating that blocks significant amounts of UV radiation) was prepared by combining about 3.4 gm of pre-hydrolyzed titanium tetrabutoxide sol of about 5% by weight of titania in n-propanol, and about 2 gm of cerium (III) nitrate solution of about 18.2% by weight ceria in n-propanol. The mixture was stabilized by using diethyleneglycol dibutylether. This mixture will be referred to in this example as the coating solution. The resulting coating solution was spin coated onto a temperable glass substrate 1 having the low-E coating 30 thereon as shown in FIG. 8. Details of the low-E coating 30 may be found in Ser. No. 10/914,636. The coated glass was then dried on a hot plate set at about 130 degrees C. for about five minutes and then heated in an oven at about 220 degrees C. for about five minutes for curing the coating solution, before it was subjected to about 650 degrees C. for about four minutes. Thus, the result was a thermally tempered coated article including the low-E coating 30 thereon for blocking significant amounts of IR radiation, and the UV coating 35 provided on the glass substrate 1 over the low-E coating 30 for blocking significant amounts of UV radiation, as shown in FIG. 8. The UV blocking coating 35 was thus made up of a mixture of oxides of cerium and titanium (e.g., $CeO_2/TiO_2$). The UV blocking coating 35 was about 0.14 µm thick. Spectral characteristics of this coated article are shown by the solid thick line in each of the graphs of FIGS. 2-3. FIG. 2 illustrates the spectral characteristics of this monolithic coated article over a wide range of wavelengths, whereas FIG. 3 focuses on the spectral characteristics in the UV and visible ranges. The average UV transmission ($T_{UV}$) of the coated article in the range of 300-380 nm was excellent in that it was only about 4.5%, and the IR transmission was also excellent as can be seen by the low-profile flat line at the right-hand side of the FIG. 2 graph. The low sheet resistance characteristics mentioned herein also indicate the good blockage of IR radiation.

Figure 3:
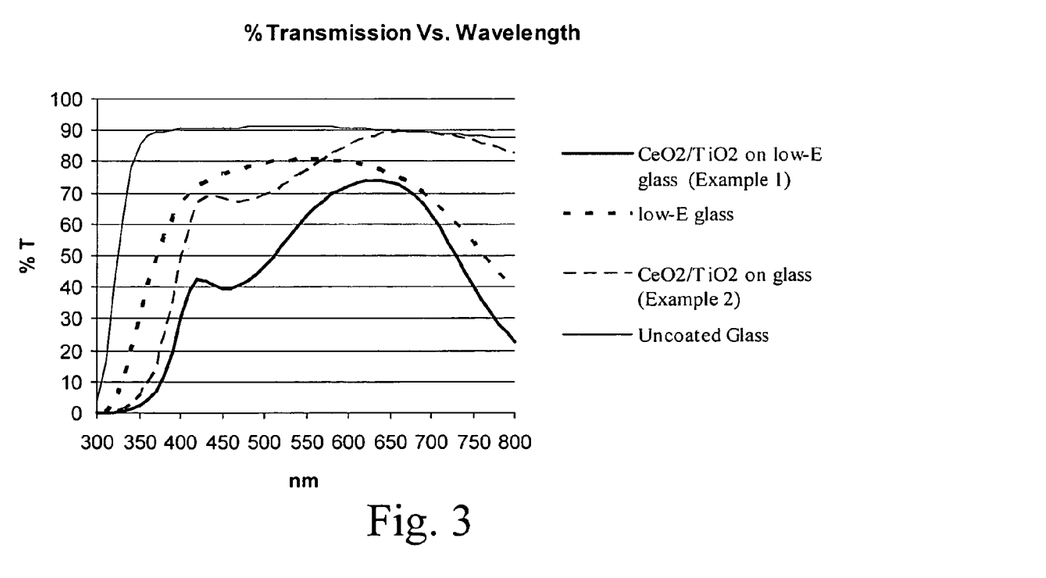
FIG. 3 is a transmission (% T) vs. wavelength graph illustrating the UV-visible spectral response of coated articles of Example 1 herein compared to other articles in the wavelength range of from about 300 to 800 nm.

In FIGS. 2-3, the thin solid line indicates the spectral characteristics of a glass substrate 1 with no coatings thereon, and the dotted line with the short dashes indicates a glass substrate 1 with only low-E coating 30 provided thereon (the same heating processes were used). Thus, it can be seen by comparing the spectral characteristics of the Example 1 coated article with an uncoated glass sheet and a glass sheet with only the low-E coating thereon, that the use of the UV blocking coating 35 significantly adds to the UV blocking capability of the coating.

EXAMPLE 2

In Example 2, the same coating solution (for a UV blocking coating that blocks significant amounts of UV radiation) of Example 1 was spin-coated directly onto a glass substrate under identical conditions as that described above in Example 1. In other words, in Example 2 the resulting coated article had no low-E coating 30. The same heat processing conditions of Example 1 were also used in Example 2. Thus, the result was a thermally tempered coated article including the UV coating 35 provided directly on the glass substrate 1. The UV blocking coating 35 was thus made up of a mixture of oxides of cerium and titanium (e.g., $CeO_2/TiO_2$). Spectral characteristics of this coated article of Example 2 are shown in FIGS. 2-3 by the dotted line with long dashes. It can be seen, especially in FIG. 2, that the coated article of Example 2 has similar UV blocking characteristics to Example 1, but not nearly as good of IR blocking characteristics as Example 1 due to the lack of the low-E coating 30 in Example 2.

EXAMPLE 3

Figure 4:
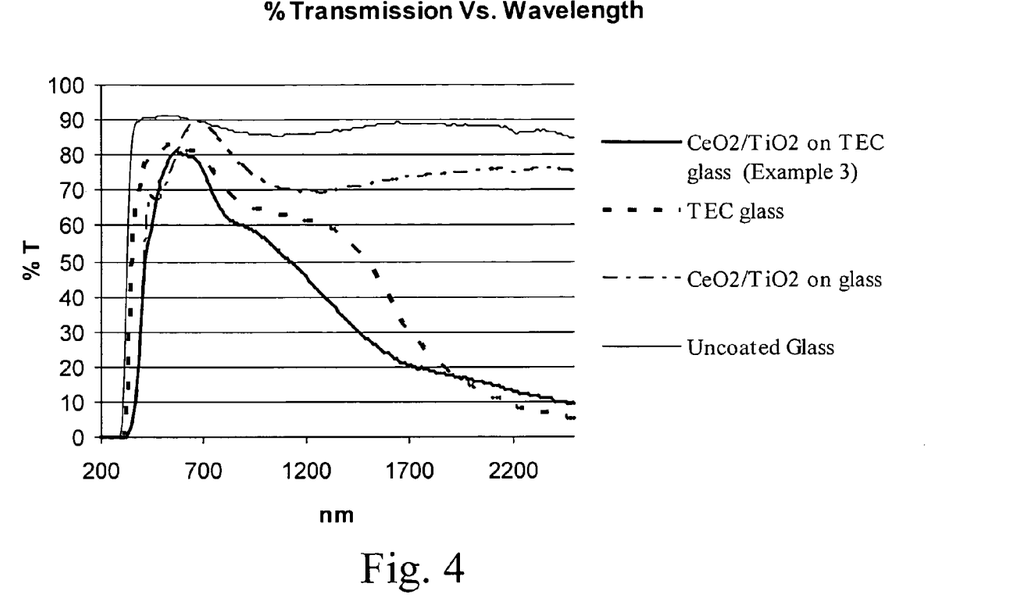
FIG. 4 is a transmission (% T) vs. wavelength graph illustrating the spectral response of coated articles of Example 2 herein compared to other articles in the wavelength range of from about 200 to 2500 nm.

In Example 3, the same coating solution (for a UV blocking coating 35 that blocks significant amounts of UV radiation) of Example 1 was spin-coated onto a glass substrate 1 over a low-E coating 30 under identical conditions as that described above in Example 1, except that a different low-E coating was provided on the glass. In this Example, the low-E coated glass was TEC-15 commercially available from Marsco Industries, located in Illinois. The coated glass substrate was subjected to the same temperature treatments as in Example 1. The UV blocking coating 35 was thus made up of a mixture of oxides of cerium and titanium (e.g., $CeO_2/TiO_2$). The UV blocking coating 35 was again about 0.14 μm thick. Spectral characteristics of this coated article are shown by the solid thick line in each of the graphs of FIGS. 4-5. FIG. 4 illustrates the spectral characteristics of this monolithic coated article over a wide range of wavelengths, whereas FIG. 5 focuses on the spectral characteristics in the UV and visible ranges. The average UV transmission ($T_{UV}$) of the coated article in the range of 300-380 nm was excellent in that it was only about 10.2%, and the IR transmission was also sufficient as can be seen by the low-profile flat line at the right-hand side of the FIG. 4 graph (although the low-E coating in this Example was not as good at blocking IR as in Example 1 as can be seen from the graphs).

Figure 5:
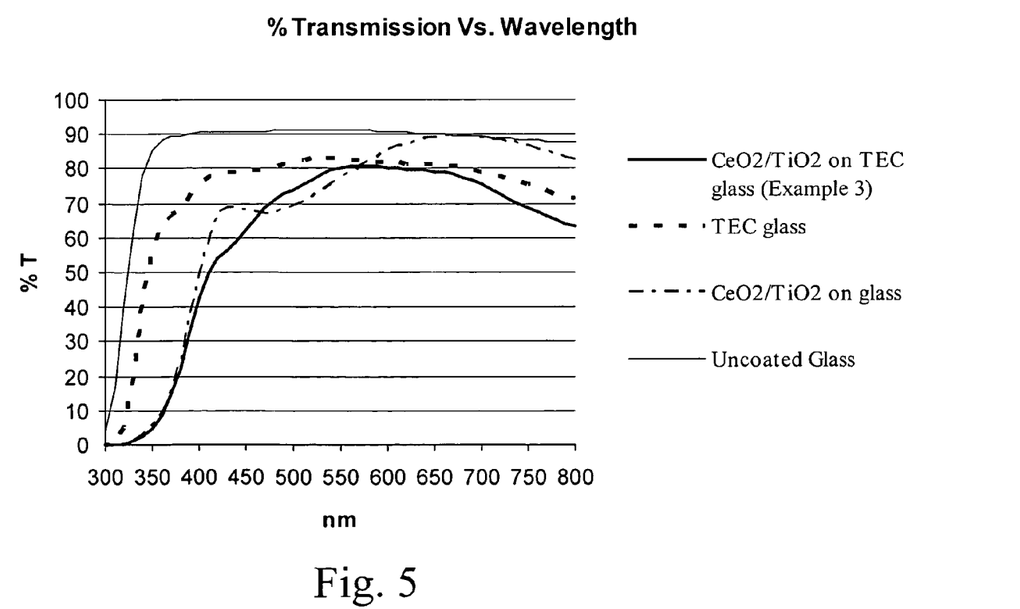
FIG. 5 is a transmission (% T) vs. wavelength graph illustrating the UV-visible spectral response of coated articles of Example 2 herein compared to other articles in the wavelength range of from about 300 to 800 nm.

In FIGS. 4-5, the thin solid line indicates the spectral characteristics of a glass substrate 1 with no coatings thereon, and the dotted line with the short thick dashes indicates a glass substrate 1 with only the TEC-15 low-E coating 30 provided thereon (the same heating processes were used). Thus, it can be seen by comparing the spectral characteristics of the Example 3 coated article with an uncoated glass sheet and a glass sheet with only the low-E coating thereon, that the use of the UV blocking coating 35 significantly adds to the UV blocking capability of the coating.

EXAMPLE 4

Figure 6:
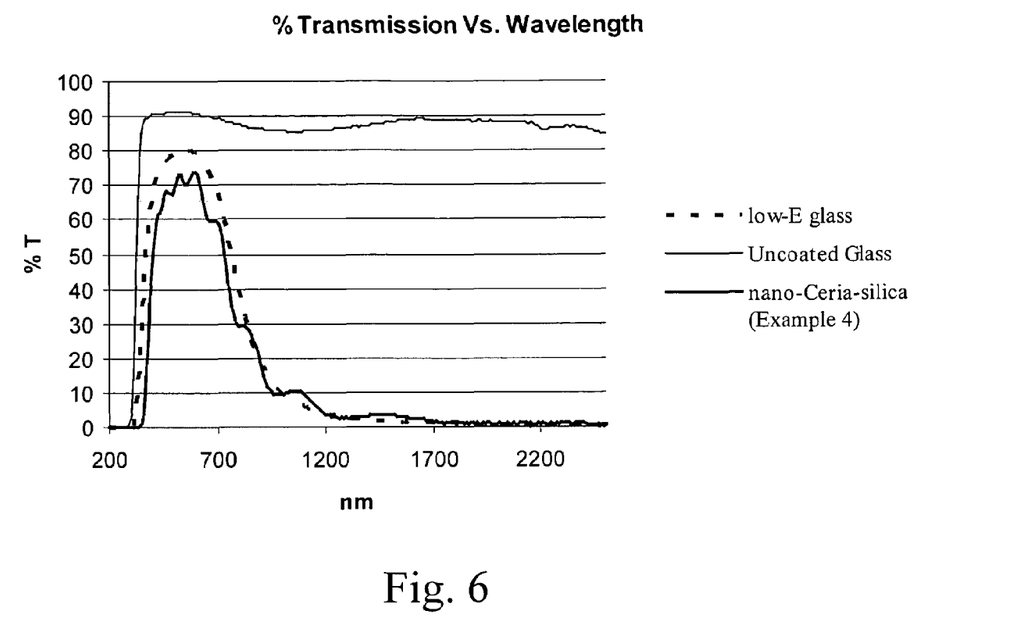
FIG. 6 is a transmission (% T) vs. wavelength graph illustrating the spectral response of coated articles of Example 3 herein compared to other articles in the wavelength range of from about 200 to 2500 nm.
Figure 7:
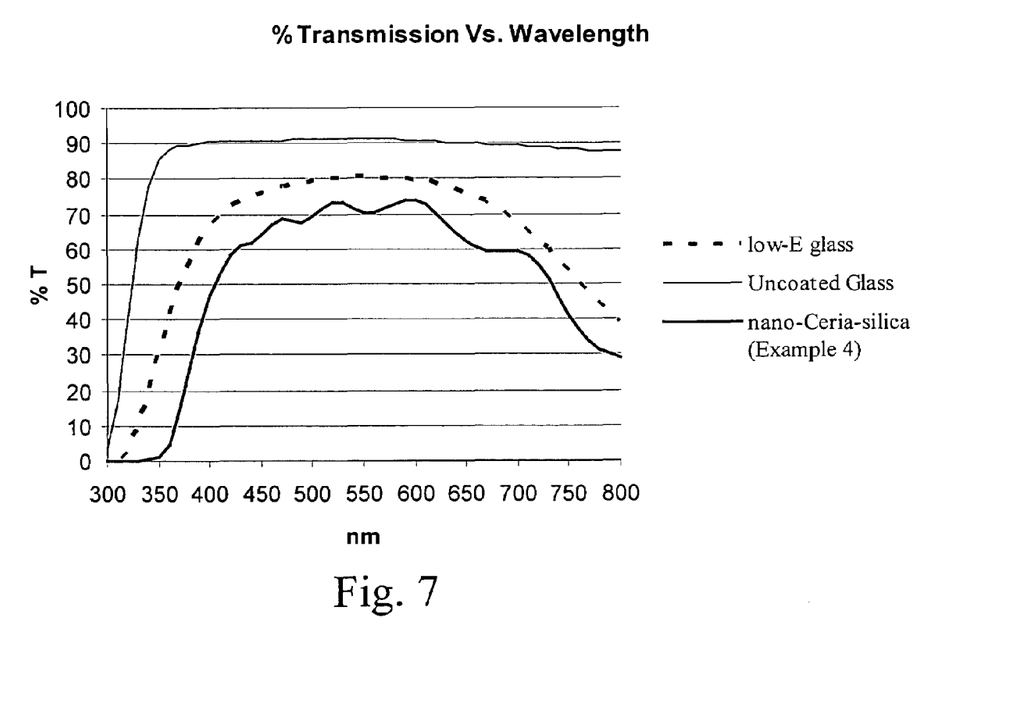
FIG. 7 is a transmission (% T) vs. wavelength graph illustrating the UV-visible spectral response of coated articles of Example 3 herein compared to other articles in the wavelength range of from about 300 to 800 nm.

In Example 4, a coating sol (for a UV blocking coating 35 that blocks significant amounts of UV radiation) was prepared by mixing cerium oxide in the form of an aqueous dispersion of nanoparticulate with pre-hydrolyzed 3-glycidoxypropyl trimethoxysilane to obtain a weight ratio of about 90% ceria to about 10% silica. The mixture was diluted with n-propanol and applied on a glass substrate 1 via spin coating over the same low-E coating 30 used in Example 1 (see FIG. 8). The ceria-silica coating was about 1.0 μm thick. The coated article, including the coatings 30 and 35 on the glass substrate 1, was subjected to the same heating processes as in Example 1. The UV blocking coating 35 was thus made up of a mixture of oxides of cerium and silicon (e.g., $CeO_2/SiO_2$). Spectral characteristics of this coated article are shown by the solid thick line in each of the graphs of FIGS. 6-7. FIG. 6 illustrates the spectral characteristics of this monolithic coated article over a wide range of wavelengths, whereas FIG. 7 focuses on the spectral characteristics in the UV and visible ranges. The average UV transmission ($T_{UV}$) of the coated article in the range of 300-380 nm was excellent in that it was only about 8.8%, and the IR transmission was also excellent as can be seen by the low-profile flat line at the right-hand side of the FIG. 6 graph. The low sheet resistance characteristics mentioned herein also indicate the good blockage of IR radiation. In FIGS. 6-7, the thin solid line indicates the spectral characteristics of a glass substrate 1 with no coatings thereon, and the dotted line indicates a glass substrate 1 with only low-E coating 30 provided thereon (the same heating processes were used). Thus, it can be seen by comparing the spectral characteristics of the Example 1 coated article with an uncoated glass sheet and a glass sheet with only the low-E coating thereon, that the use of the UV blocking coating 35 of this Example significantly adds to the UV blocking capability of the coated article.

While the coatings herein may be applied to the substrate so as to directly contact the substrate (e.g., glass substrate), it is possible that other layer(s) may be provided between the coating and the glass substrate in certain example instances. It is also possible that substrates of other materials may be used instead of glass. It is also possible that other layer(s) may be provided between the low-E coating and the UV blocking coating. It is also possible that the low-E coating may be deleted in certain alternative embodiments of this invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a coated article, the method comprising:

forming a low-E coating on a glass substrate, the low-E coating comprising at least one infrared (IR) reflecting layer located between at least first and second dielectric layers;

applying a wet coating comprising titania and ceria on the glass substrate over the low-E coating, curing the wet coating solution to form a UV blocking coating on the glass substrate, the UV blocking coating comprising a mixture of oxides of cerium and titanium, wherein the coated article has a transmission at 2300 nm of less than 10%, wherein the coated article has a transmission at 1700 nm of no greater than 30%, and wherein the UV blocking coating comprises from about 5-20% titanium oxide and from about 60-95% cerium oxide.

2. The method of claim 1, further comprising thermally tempering the glass substrate with each of the low-E coating and the UV blocking coating thereon.

3. The method of claim 1, wherein the coated article has a transmission at 2300 nm of less than 5%.

4. The method of claim 1, wherein the UV blocking coating further comprises:

| | |
|---|---|
| titanium oxide: | from about 5-20% |
| cerium oxide: | from about 60-95% |
| silicon oxide: | from about 5-50%. |

5. The method of claim 1, wherein the coated article has a transmission at 600 nm of at least about 60%.

6. The method of claim 1, wherein the coated article has a transmission at 600 nm of at least about 70%.

7. The method of claim 1, wherein the IR reflecting layer comprises Ag.

8. A method of making a coated article, the method comprising:

forming a low-E coating on a glass substrate, the low-E coating comprising at least one infrared (IR) reflecting layer located between at least first and second dielectric layers;

applying a wet coating comprising a silane and ceria on the glass substrate over the low-E coating, curing the wet coating to form a UV blocking coating on the glass substrate, the UV blocking coating comprising a mixture of oxides of silicon and cerium, and optionally titanium, wherein the coated article has a transmission at 2300 nm of less than 10%, wherein the coated article has a transmission at 1700 nm of no greater than 30%, and wherein the UV blocking coating comprises from about 0-50% titanium oxide and from about 60-95% cerium oxide.

9. The method of claim 8, wherein the wet coating comprises the silane, titanate, and a dispersion of ceria particles.

10. The method of claim 8, further comprising thermally tempering the glass substrate with each of the low-E coating and the UV blocking coating thereon, and wherein the coated article has a transmission at 2300 nm of less than 5%.

11. The method of claim 8, wherein the UV blocking coating comprises:

| | |
|---|---|
| silicon oxide: | from about 5-20% |
| cerium oxide: | from about 60-95%. |

12. The method of claim 8, wherein the coated article has a transmission at 600 nm of at least about 60%.

13. The method of claim 8, wherein the IR reflecting layer comprises Ag.

14. A method of making a coated article, the method comprising:

forming a low-E coating on a glass substrate, the low-E coating comprising at least one infrared (IR) reflecting layer located between at least first and second dielectric layers;

applying a wet coating comprising at least one UV blocking oxide and/or at least one precursor of a UV blocking oxide on the glass substrate over the low-E coating, forming a UV blocking and IR blocking coating on the glass substrate and subjecting the coated glass substrate to a heat treatment process including temperatures of at least about 580 degrees C., wherein the coated article has a transmission at 600 nm of at least about 60%, wherein the coated article has a transmission at 1700 nm of no greater than 30%, and wherein the UV blocking coating comprises from about 5-20% titanium oxide, from about 60-95% cerium, and from about 5-50% oxide silicon oxide.

15. The method of claim 14, wherein the wet coating comprises at least one metal oxide from the group consisting of ceria, titania, zinc oxide, bismuth oxide, tin oxide and antimony oxide, and/or a precursor of at least one of these metal oxides.

* * * * *